United States Patent
Ozeki et al.

(10) Patent No.: US 7,056,037 B2
(45) Date of Patent: Jun. 6, 2006

(54) OPTICAL BIDIRECTIONAL MODULE

(75) Inventors: Yukihiro Ozeki, Fujisawa (JP);
Kazumi Furuta, Akishima (JP);
Hiroaki Ueda, Suita (JP); Manami Kuiseko, Kyoto (JP); Koujirou Sekine, Ibaraki (JP); Mitsuru Yokoyama, Takatsuki (JP); Naoki Mitsugi, Hino (JP); Koji Horii, Tokyo (JP)

(73) Assignee: Konica Minolta Holdings, Inc. (JP)

( * ) Notice: Subject to any disclaimer, the term of this patent is extended or adjusted under 35 U.S.C. 154(b) by 0 days.

(21) Appl. No.: 10/995,668

(22) Filed: Nov. 23, 2004

(65) Prior Publication Data
US 2005/0175295 A1   Aug. 11, 2005

(30) Foreign Application Priority Data
Nov. 27, 2003 (JP) ............................. 2003-396574
Nov. 5, 2004 (JP) ............................. 2004-322126

(51) Int. Cl.
*G02B 6/34* (2006.01)
*G02B 6/42* (2006.01)

(52) U.S. Cl. ............................. 385/92; 385/33; 385/37

(58) Field of Classification Search .................. 385/37
See application file for complete search history.

(56) References Cited

U.S. PATENT DOCUMENTS 5,555,334 A * 9/1996 Ohnishi et al. ................ 385/93
6,504,975 B1 * 1/2003 Yamagata et al. ............. 385/33

FOREIGN PATENT DOCUMENTS

JP           08015582 A   *   1/1996

* cited by examiner

*Primary Examiner*—Michelle Connelly-Cushwa
(74) *Attorney, Agent, or Firm*—Cantor Colburn LLP

(57) ABSTRACT

An optical bidirectional module 10 having therein light emitting element 11 which transmits optical signal to the end facet of the optical fiber, light receiving element 12 which receives optical signal from the end facet of the optical fiber and stair-shaped multi-level grating 15, wherein the stair-shaped multi-level grating separates the first light path between the end facet of optical fiber and the light emitting element and the second light path between the end facet of optical fiber and the light receiving element by a different wavelength of each optical signal, when the module mixes and separates optical signal with different wavelengths traveling in opposite directions related to the end facet of the optical fiber 1, used for bidirectional optical fiber communication by means of a wavelength multiplex system.

9 Claims, 16 Drawing Sheets (1) FREE CURVED LINE (2) SECOND ORDER CURVED LINE (3) STRAIGHT LINE UNEQUAL INTERVAL (4) STRAIGHT LINE EQUAL INTERVAL

OPTICAL BIDIRECTIONAL MODULE

BACKGROUND OF THE INVENTION

The present invention relates to an optical bidirectional module used for transmission and reception terminals for bidirectional optical fiber communication by means of a wavelength multiplex system.

In optical communication systems by means of optical transmission lines such as optical fiber lines, plural optical signals with different wavelengths are transmitted simultaneously through optical fiber by means of WDM (Wavelength Division Multiplex System), and bidirectional optical transmission modules are used in transmission and reception terminals for optical signals. A bidirectional optical transmission module of this kind is known by, for example, Patent Document 1 indicated below. This bidirectional optical transmission module contains light emitting element 100 and light receiving element 700 in a common package 120 and has holographic diffraction grating 600 on the upper or lower surface of cover glass 220 at an aperture of the package as shown in FIG. 5.

A light beam emitted from light emitting element 100 is transmitted through diffraction grating 600, and its zero$^{th}$-order diffracted light ray beam is focused on end facet 500 of optical fiber 400 by lens 300 in the transmission process. A light beam emitted from the end facet 500 of optical fiber 400 reaches diffraction grating 600 by way of lens 300 to be diffracted by diffraction grating 600 so that +first-order diffracted beam of the light may be focused on light detecting surface of light receiving element 700 and transmission signals from optical fiber 400 may be received in the reception process.

The diffraction grating 600 is structured as a two-level binary grating so that straight grating grooves 200 are formed on a flat plane of cover glass 220 (refractive index n) as shown in FIG. 6. However, when the two-level grating is employed for diffraction grating 600, it is difficult to maximize zero$^{th}$-order diffraction efficiency for another light with wavelength $\lambda 0$, because each dimension of grating structure such as groove depth d, groove width W and pitch of grooves P are determined automatically based on the maximum condition of first-order diffracted light ray with wavelength $\lambda 1$ which is given by $\lambda 1/\{2(n-1)\}$.

[Patent Document 1] U.S. Pat. No. 5,555,334

SUMMARY OF THE INVENTION

An object of the invention is to provide a low-cost high performance optical bidirectional module which is able to maximize each diffraction efficiency of different orders for light beams with different wavelengths, in view of problems of the conventional technique mentioned above.

In order to accomplish the above objectives, the optical bidirectional module of the invention is what mixes and separates optical signals with different wavelengths used for bidirectional optical fiber communication by means of a wavelength multiplex system, and has a light emitting element which transmits optical signals to the end facet of the optical fiber, a light receiving element which receives optical signals coming from the end facet of the optical fiber and a stair-shaped multi-level grating so that the stair-shaped multi-level grating can separate efficiently the first light path between the end facet of optical fiber and the light emitting element from the second light path between the end facet of optical fiber and the light receiving element because of the different wavelengths of the respective light signals.

It is possible to maximize diffraction efficiency of different order diffraction for light beams with different wave lengths and also possible to realize a low-cost high performance optical bidirectional module with this optical bidirectional module, wherein the stair-shaped multi-level grating separates efficiently a light path between an end facet of optical fiber and a light emission device from another light path between the end facet of optical fiber and a light receiving element by means of different wavelengths of respective light signals.

It is preferable to allocate the wavelength of optical signal from the light emitting element to zero$^{th}$-order diffracted (or non-diffracted) light ray and to allocate the wavelength of optical signal which corresponds to the second light path to light receiving element to a diffracted light ray the order of which is higher than zero$^{th}$ order in the optical bidirectional module. Thereby, zero$^{th}$-order diffracted light ray can be used in the transmission channel and, for example, diffracted light ray the order of which is higher than zero$^{th}$ can be used in the reception channel in the optical bidirectional module.

It is preferable that height h of each step of the stair-shaped multi-level grating satisfies the equation (1) described below. Thereby, it becomes possible to maximize the efficiency of high-order (first or higher than first) diffracted light ray.

$$h = K \cdot \{ (M-1)/M \} \cdot \{\lambda 1/(n-1)\} \quad (1)$$

M: Number of steps of stair-shaped multi-level grating
$\lambda 1$: Wavelength of high-order (first or higher than first) diffracted light ray
n: Refractive index of composite material of grating
K: Integer (Preferably smaller than or equal to 3 but not limited to)

It is preferable that an optical path length difference $h(n-1)$ between two adjacent steps constructing the stair-shaped multi-level grating is an integer multiple of the wavelength $\lambda 0$ of a zero$^{th}$-order diffracted light ray. Namely, by satisfying the following formula, while the efficiency of a diffracted light ray whose diffraction order is the first or higher is maximized, also the efficiency of a zero$^{th}$-order diffracted light ray can be maximized simultaneously.

$$h(n-1)/\lambda 0 = J (J: \text{an integer})$$

It is preferable that line pitches of the aforementioned stair-shaped multi-level grating projected on a plane perpendicular to the optical axis of the lens are set to be unequal. By means of this, for example, when a diffracted light ray beam having a large aberration the order of which is higher than zero$^{th}$ is received by a light receiving element, the shape of the incident spot can be improved on the light receiving surface, and therefore, coupling power on the light receiving surface can be improved beyond in the case where an even pitch grating is employed.

The aforementioned stair-shaped multi-level grating can be formed to have straight lines unevenly spaced over the effective grating area or to have curved lines unevenly spaced, when projected on a plane perpendicular to the optical axis of the grating. When the former structure is employed, the manufacturability of the grating is better but the perfection of the spot shaping is lower. When the latter is employed, the spot shaping is nearly perfect but the manufacturability of the grating is lower.

It is preferable to place a coupling lens between the end facet of optical fiber and the light emitting element as well as the light receiving element, and to construct the grating on the coupling lens surface facing the end facet of the optical fiber. Thereby, a variation range of optical level caused by wavelength variation can be made smaller because wavelength-dependency of grating diffraction efficiency becomes lower.

A mirror or reflecting surface may be placed between the grating and the light emitting element as well as the light receiving element, so that the first light path and the second light path may be deflected at least in one place each. Thereby, whole size of the optical bidirectional module can be made smaller.

The invention makes it possible to provide a low-cost high performance optical bidirectional module which is used for transmission and reception terminals for bidirectional optical fiber communication by means of a wavelength multiplex system and which can maximize a diffraction angle and diffraction efficiency of different orders for light beams with different wavelengths.

PREFERRED EMBODIMENT TO PRACTICE THE INVENTION

Figure 1:
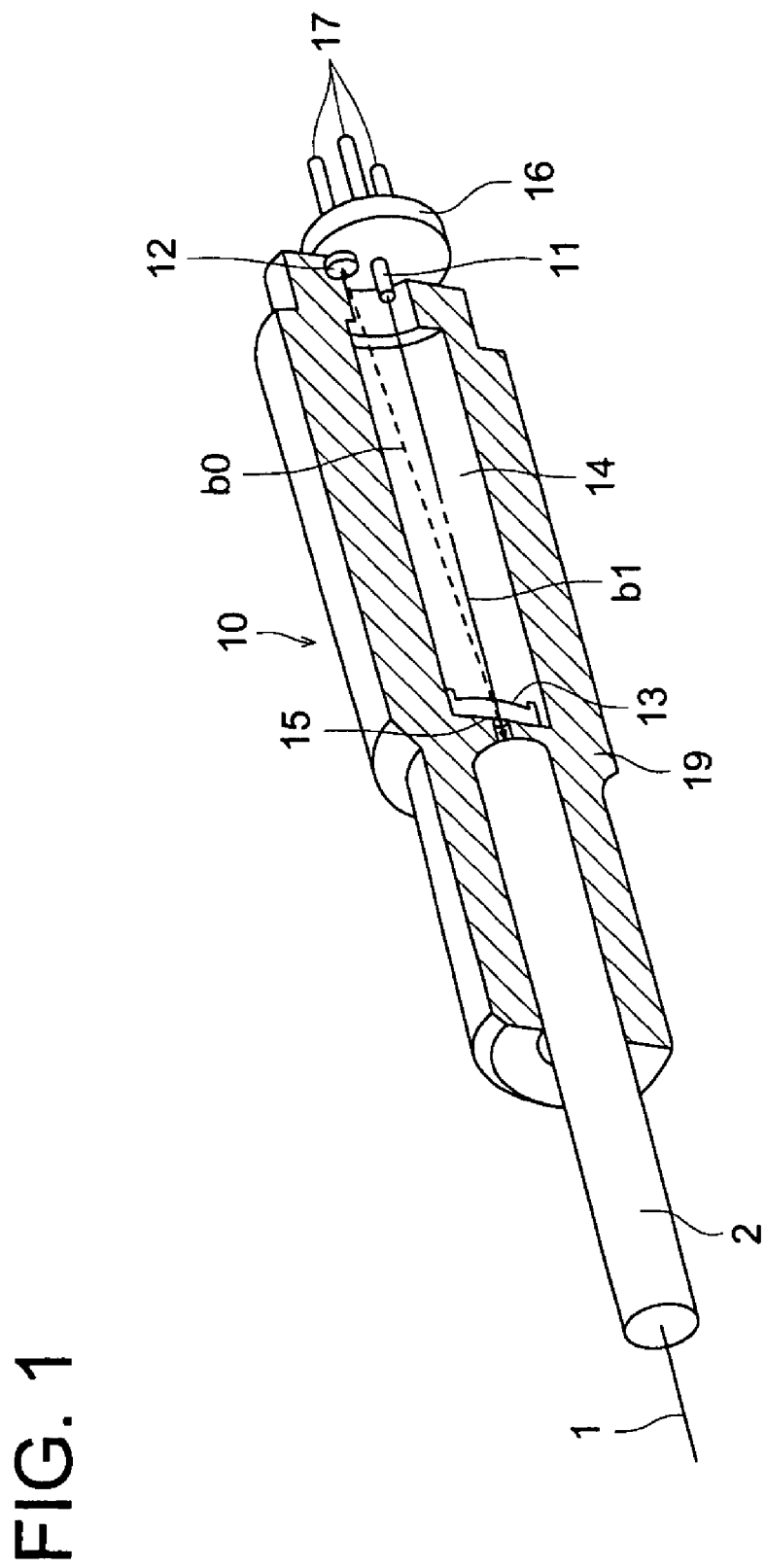
FIG. 1 is a perspective view of inside of the cross sectional optical bidirectional module of the embodiment.
Figure 2:
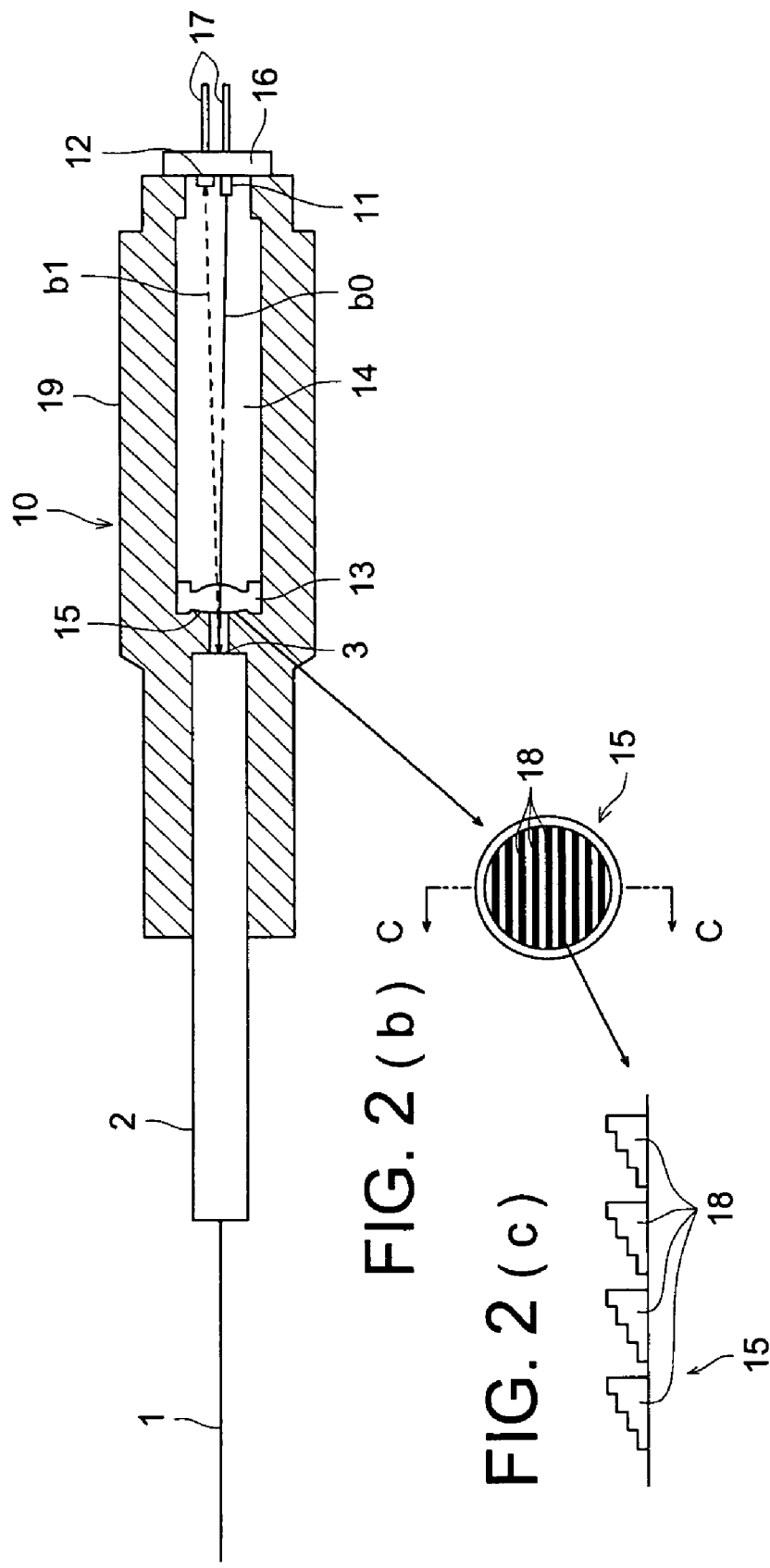
FIG. 2 includes a longitudinal cross-sectional view (a) of main parts of the optical bidirectional module shown in FIG. 1, an enlarged plan view (b) showing gratings formed on the surface of the coupling lens shown in FIG. 1 and a schematic cross-sectional view (c) of the grating structure taken on line C—C.

A preferred embodiment to practice the invention will be explained by referring to drawings. FIG. 1 is a perspective view showing an internal structure of the halved optical bidirectional module of the preferred embodiment. FIG. 2 shows longitudinal cross-sectional view (a) of optical bidirectional module main parts in FIG. 1, enlarged plan view (b) of a grating formed on the coupling lens shown in FIG. 1 and schematic cross-sectional view (c) of the grating structure taken on line C—C.

As illustrated in FIG. 1 and FIG. 2(a), optical bidirectional module 10 having light emitting element 11, light receiving element 12 and coupling lens 13 in a long, substantially cylindrical casing 19. The light emitting element 11 and light receiving element 12 are installed on a common base 16, which is fixed to the casing, and electrically connected with plural connecting pins 17 projecting outward from the base 16.

Fiber holder 2 which holds optical fiber 1 is inserted and fixed in casing 19 and end facet 3 of optical fiber 1 is exposed to cavity 14 formed in the casing 19. The optical fiber 1 is connected to an optical transmission line such as outer optical fiber for bidirectional optical fiber communication by a wavelength multiplex system.

Coupling lens 13 is located near the end facet 3 of optical fiber 1 in cavity 14 in casing 19, facing light emitting element 11 and light receiving element 12 on the opposite side.

On the surface of coupling lens 13 on the end facet 3 side, grating 15 is formed in the shape of stripes as shown in FIG. 2(b). The grating 15 is structured so that stair-shaped multi-level gratings 18 are formed as shown in the cross-sectional view of FIG. 2(c).

A light beam b0 emitted from the light emitting element 11 passes through coupling lens 13 and grating 15 and enters end facet 3 of optical fiber 1 as zero$^{th}$-order diffraction light and can be transmitted to an outer optical transmission line through optical fiber 1.

On the other hand, a light beam from end facet 3 which is transmitted from the outside, passes through grating 15 and coupling lens 13 and enters light receiving element 12 after being diffracted by grating 15 and converted into diffracted light ray B1 the order of which is higher than zero$^{th}$.

Figure 4:
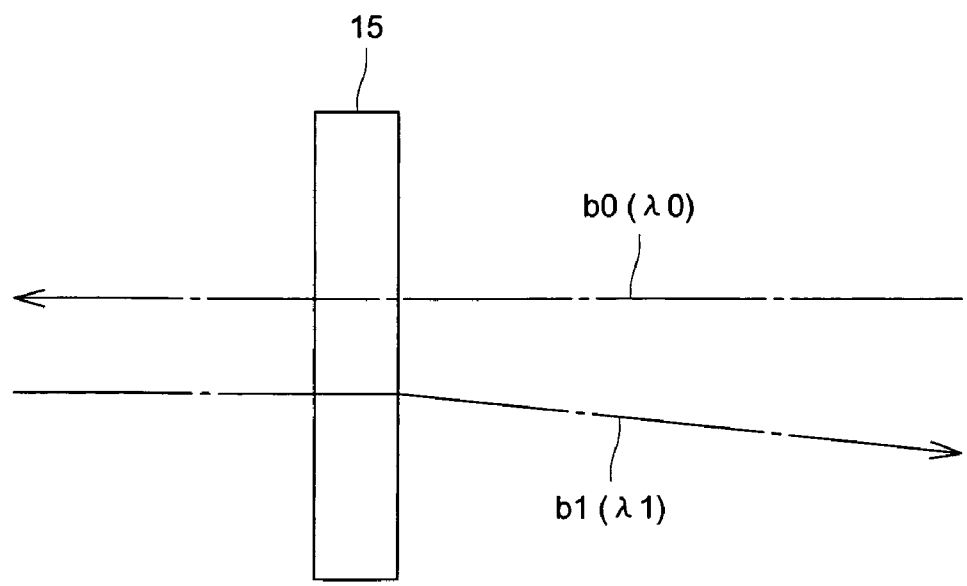
FIG. 4 is a view showing schematically zero$^{th}$-order diffracted light ray with wavelength $\lambda 0$ and diffracted light ray with wavelength $\lambda 1$, the order of which is higher than zero$^{th}$ order, traveling toward opposite directions each other through grating 15 shown in FIG. 2 and FIG. 3.
Figure 5:
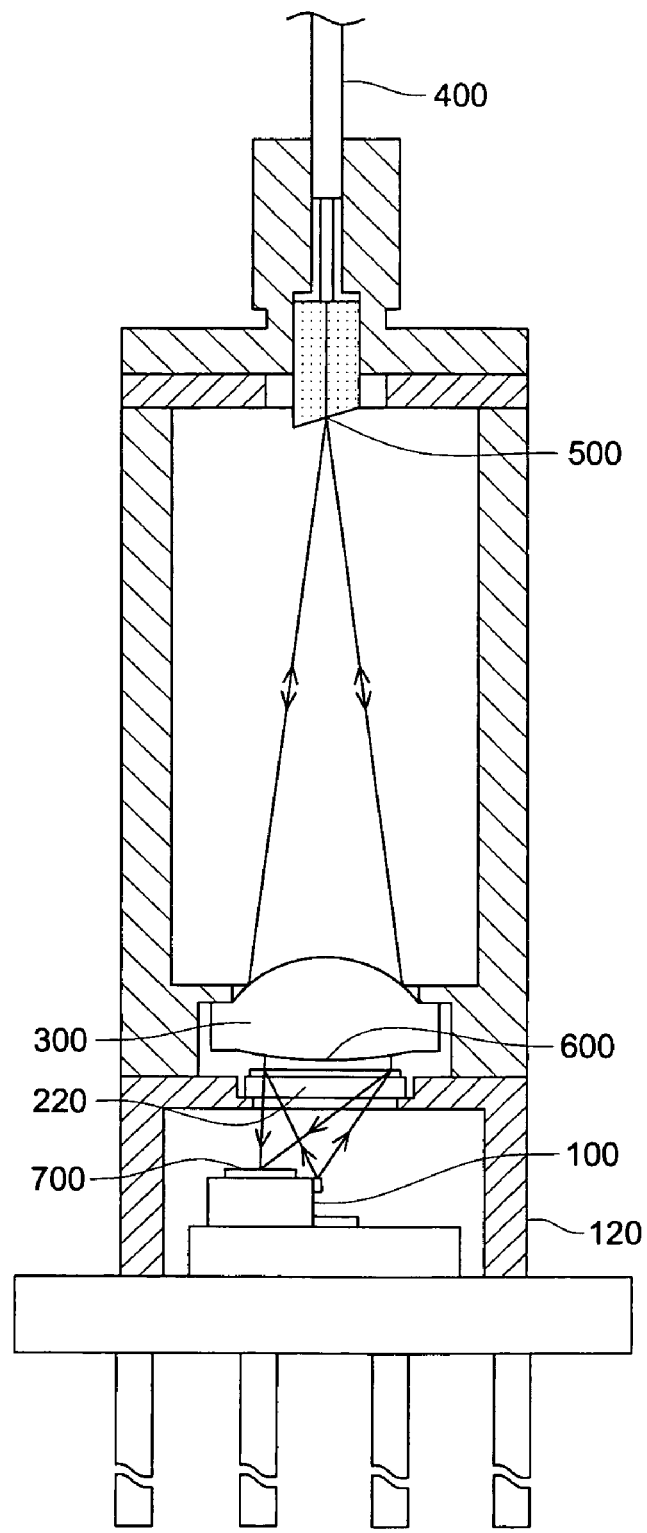
FIG. 5 is a cross-sectional view of main parts showing an example of conventional optical bidirectional modules.

As stated above, in the optical bidirectional module 10, light beam b0 and diffracted light ray b1 the order of which is higher than zero$^{th}$ are in a situation of mixture at end facet 3 of optical fiber 1, however, they are separated by the grating 15 formed on the coupling lens 13, and beam b0 with wavelength λ0 travels along the first light path illustrated by a dotted line and diffracted light ray b1 with wavelength λ1, the order of which is higher than zero$^{th}$, travels to the opposite direction of that of light b0 along second light path illustrated by a broken line, and the both light paths separate on the side on which the light emitting element 11 and light receiving element 12 exist, as shown in FIG. 1, FIG. 2(a) and FIG. 4.

Wavelength λ0 of light beam (zero$^{th}$-order diffracted light ray) b0 to be transmitted is, for example, 1.3 μm and, on the other hand, wavelength λ1 of diffracted light ray b1, the order of which is higher than zero$^{th}$, to be received is, for example, 1.5 μm, so that wavelength λ0 and λ1 are different from each other.

Next, there will be explained composition of grating 15 described above, which can maximize both efficiency of diffracted light ray the order of which is higher than zero$^{th}$ and efficiency of zero$^{th}$-order diffracted light ray, referring to FIG. 3 and FIG. 4.

Figure 3:
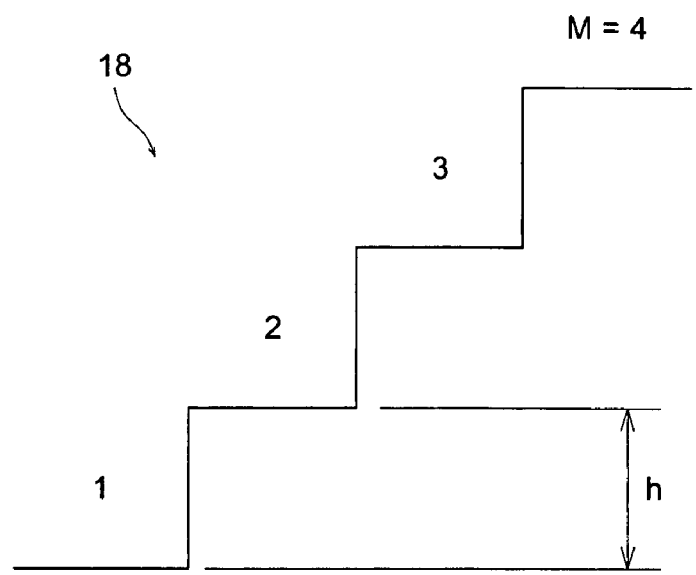
FIG. 3 is a view explaining the number of steps M and height h of each step of stair-shaped multi-level grating 18 shown in FIG. 2(c).

FIG. 3 explains number of step M and height h of each step of stair-shaped multi-level grating 18 shown in FIG. 2(c). FIG. 4 indicates schematically zero$^{th}$-order diffracted light ray with wavelength λ0 and diffracted light ray with wavelength λ1, the order of which is higher than zero$^{th}$, traveling toward opposite directions to each other at grating 15.

Stair-shaped multi-level gratings 18 of grating 15 formed on coupling lens 13 as shown in FIG. 3 is structured so that the each step height h satisfies equation (1) relating to diffracted light ray b1 with wavelength λ1, the order of which is higher than zero$^{th}$, diffracted by grating 15 as shown in FIG. 4.

$$h = K \cdot \{(M-1)/M\} \cdot \{\lambda 1/(n-1)\} \quad (1)$$

M means the number of steps of stair-shaped multi-level grating 18 and M=4 in the case of FIG. 3. The symbol n is the refractive index of coupling lens 13. K is an integer and is preferably to be smaller than or equal to 3 but not limited to.

Figures 7A, 7B, 7C:
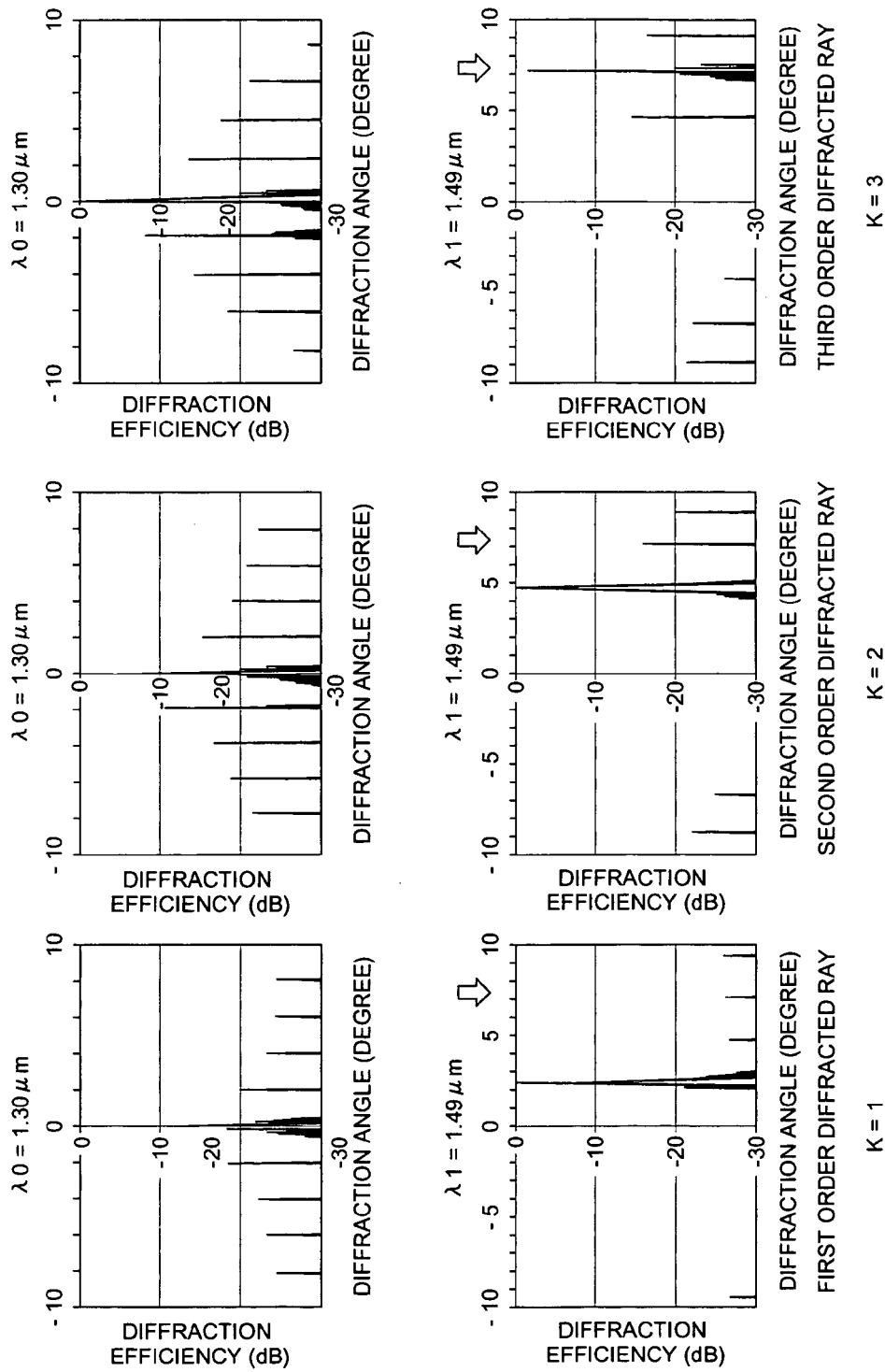
FIG. 7 includes graphs showing relations between diffraction angles and diffraction efficiency, regarding first-order diffracted light ray (a), second-order diffracted light ray (b) and third-order diffracted light ray (c), which are diffracted by grating 15 for two light beams having respectively wavelengths $\lambda 0$ of 1.30 µm and $\lambda 1$ of 1.49 µm, in this embodiment.

FIG. 7 shows graphs indicating relations between diffraction angles and diffraction efficiency for diffracted light ray (first-order, second-order and third-order) which are diffracted by the above mentioned grating 15 for two beams, wherein the wavelength λ0 of one beam is 1.30 μm and the wavelength λ1 of the other beam is 1.49 μm. In case of K=1, diffraction efficiency of first-order diffracted light ray is the highest as shown in FIG. 7(a). In case of K=2, diffraction efficiency of second-order diffracted light ray is the highest as shown in FIG. 7(b). And moreover, in case of K=3, diffraction efficiency of third-order diffracted light ray is the highest as shown in FIG. 7(c).

However, in case of higher-order than third-order, diffraction efficiency of diffracted light ray tends to be decreasing as the order increases and it is not preferable. Therefore, the integer K in equation (1) is preferably to be smaller than or equal to 3.

It is possible to maximize efficiency of diffracted light ray b1 with wavelength λ1 the order of which is higher than zero$^{th}$ by decision of step height h of stair-shaped multi-level grating 18 as mentioned above.

The number of steps M of stair-shaped multi-level grating 18 is selected so as to satisfy equation (2) with regard to zero$^{th}$-order diffracted light ray b0 with wavelength λ0 transmitted through grating 15 and diffracted light ray b1 with wavelength λ1, the order of which is higher than zero$^{th}$, diffracted by grating 15 as shown in FIG. 4.

$$h(n-1)/\lambda 0 = J \quad (2)$$

Here, J is an integer.

It is possible to maximize not only diffraction efficiency of diffracted light ray b1 with wavelength λ1, the order of which is higher than zero$^{th}$, but also diffraction efficiency of zero$^{th}$-order diffracted light ray b0 with wavelength λ0 by decision of the number of steps M of stair-shaped multi-level grating 18 as mentioned above.

Figure 6:
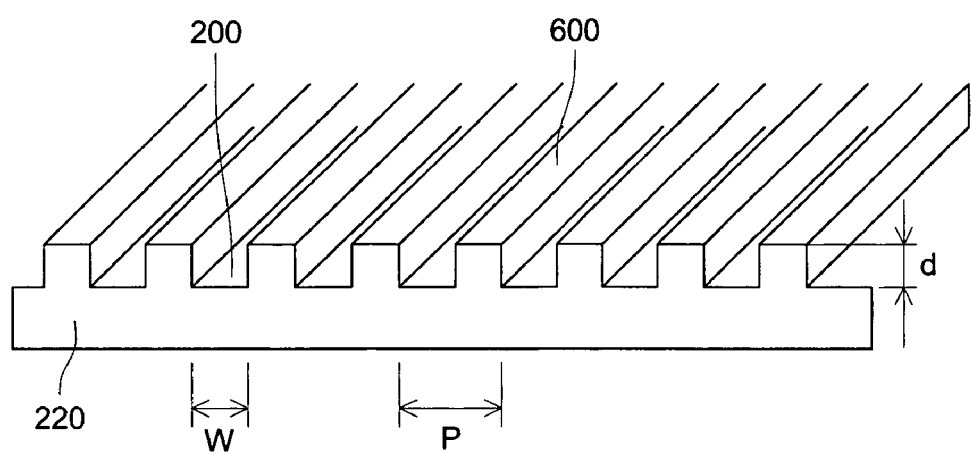
FIG. 6 is a perspective view of two-level grating used for conventional optical bidirectional modules in FIG. 5.

Formerly, when the efficiency of diffracted light ray, the order of which is higher than zero$^{th}$, diffracted by two-level grating like one in FIG. 6 was maximized, each dimension of the grating structure was automatically decided according to the maximum condition, and it was difficult to maximize efficiency of zero$^{th}$-order diffracted light ray with different wavelengths. However, according to optical bidirectional module 10 composed as mentioned above, it becomes possible not only to maximize diffraction efficiency of diffracted light ray b1 with wavelength λ1, the order of which is higher than zero$^{th}$, but also to maximize diffraction efficiency of zero$^{th}$-order diffracted light ray b0 with wavelength λ0 to realize higher performance of the optical bidirectional module, because the stair-shaped multi-level grating makes it possible to maximize diffraction efficiency of different order diffraction for light beams with two different wavelengths.

With the use of optical bidirectional module 10 of the preferred embodiment for transmission and reception terminals of an optical communication system which can transmit plural optical signals with different wavelengths through optical fiber simultaneously by means of WDM (Wave Division Multiplex System), it becomes possible to carry out efficient transmission and reception of optical signals in both traveling directions.

Since stair-shaped multi-level grating 15 has only to be formed on coupling lens 13, a low-cost high performance optical bidirectional module can be obtained.

The grating 15 is formed on the surface of coupling lens 13 facing end facet 3 of optical fiber 1, and this surface can be either the convex side or the flat side of the coupling lens 13. Incidentally, when a grating is formed on the convex side of a plano-convex lens, one surface (flat side) is free to be used for other functions such as aberration correction and another diffraction, so as to make it higher in terms of function and performance than a lens having a grating on the side of the flat surface.

Next, referring to FIG. 9–FIG. 14, an explanation will be given regarding examples in which planar pitches of the aforementioned stair-shaped multi-level grating, projected on a plane perpendicular to the optical axis of the grating are uneven.

Figure 9:
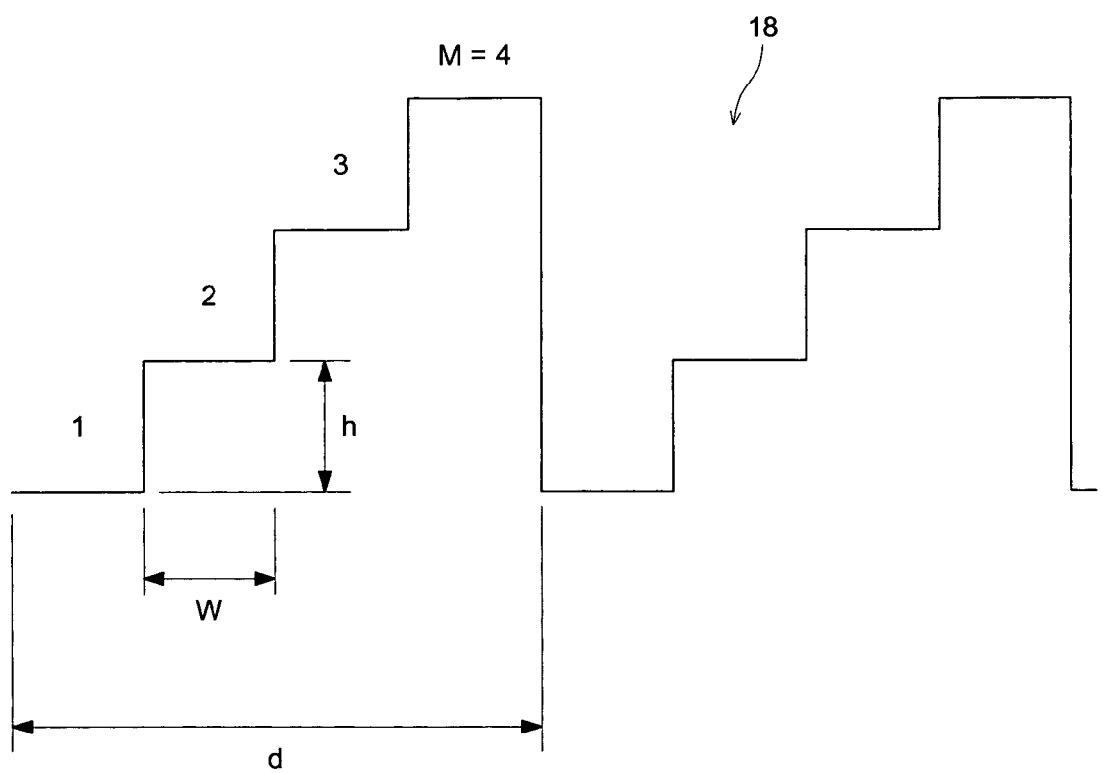
FIG. 9 is a diagram for illustrating the number of the steps M of stair-shaped multi-level grating 18, height h of each step, width W of each step and pitch d.
Figure 10:
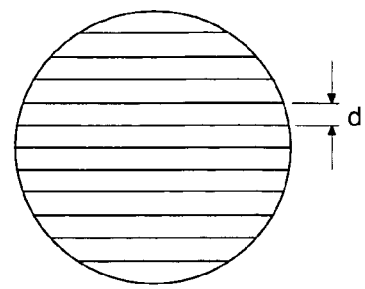
FIG. 10 is a schematic plan view showing pitch space of stair-shaped multi-level grating 18 emphatically in the case where pitch d in FIG. 9 is evenly given by straight lines (a), the case where it is unevenly given by straight lines (b), the case where it is unevenly given by quadratic curved lines (c) and the case where it is unevenly given by free-form curved lines (d).
Figure 10:
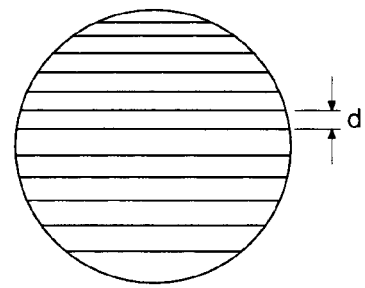
Figure 10:
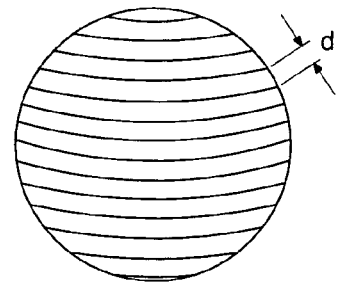
Figure 10:
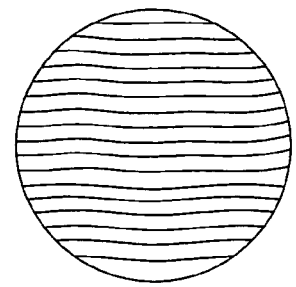

FIG. 9 is a diagram to be used for explaining the number of steps M, height of each step h, width W of each step and pitch d of stair-shaped multi-level grating 18 in FIG. 2(c). FIG. 10 shows schematic plan views of gratings emphatically showing pitch interval of stair-shaped multi-level grating 18 shown in FIG. 2, including occasions when pitch d in FIG. 9 is evenly given by straight lines (a), when the pitch d is unevenly given by straight lines (b), when the pitch d is unevenly given by quadratic curved lines (c) and when the pitch d is unevenly given by free-form curved lines (d).

Figure 11:
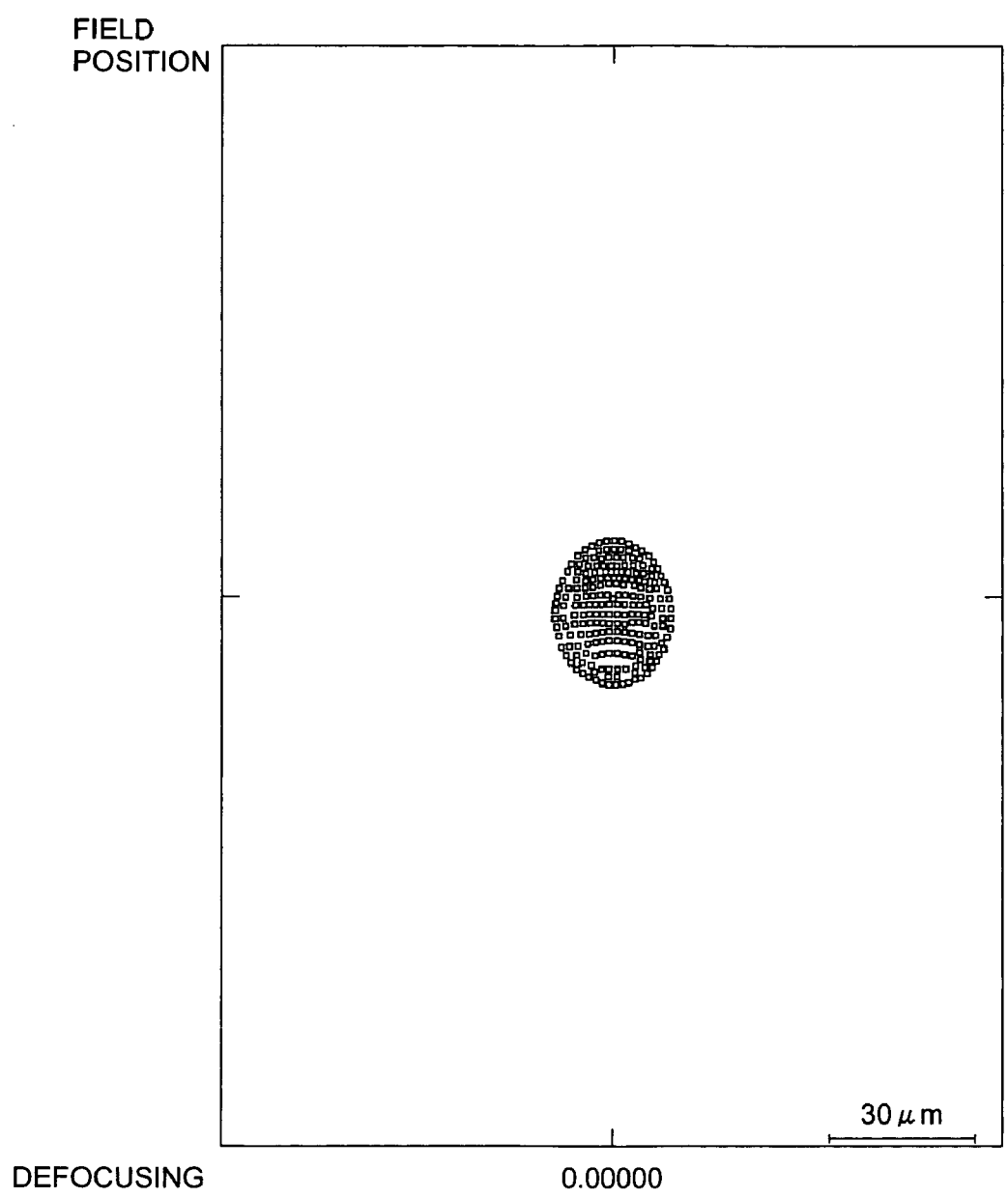
FIG. 11 is a view showing an enlarged appearance of a spot formed by focusing light on a light receiving surface of light receiving element 12 in FIG. 2 in the event of FIG. 10(a) (evenly spaced by straight lines).
Figure 12:
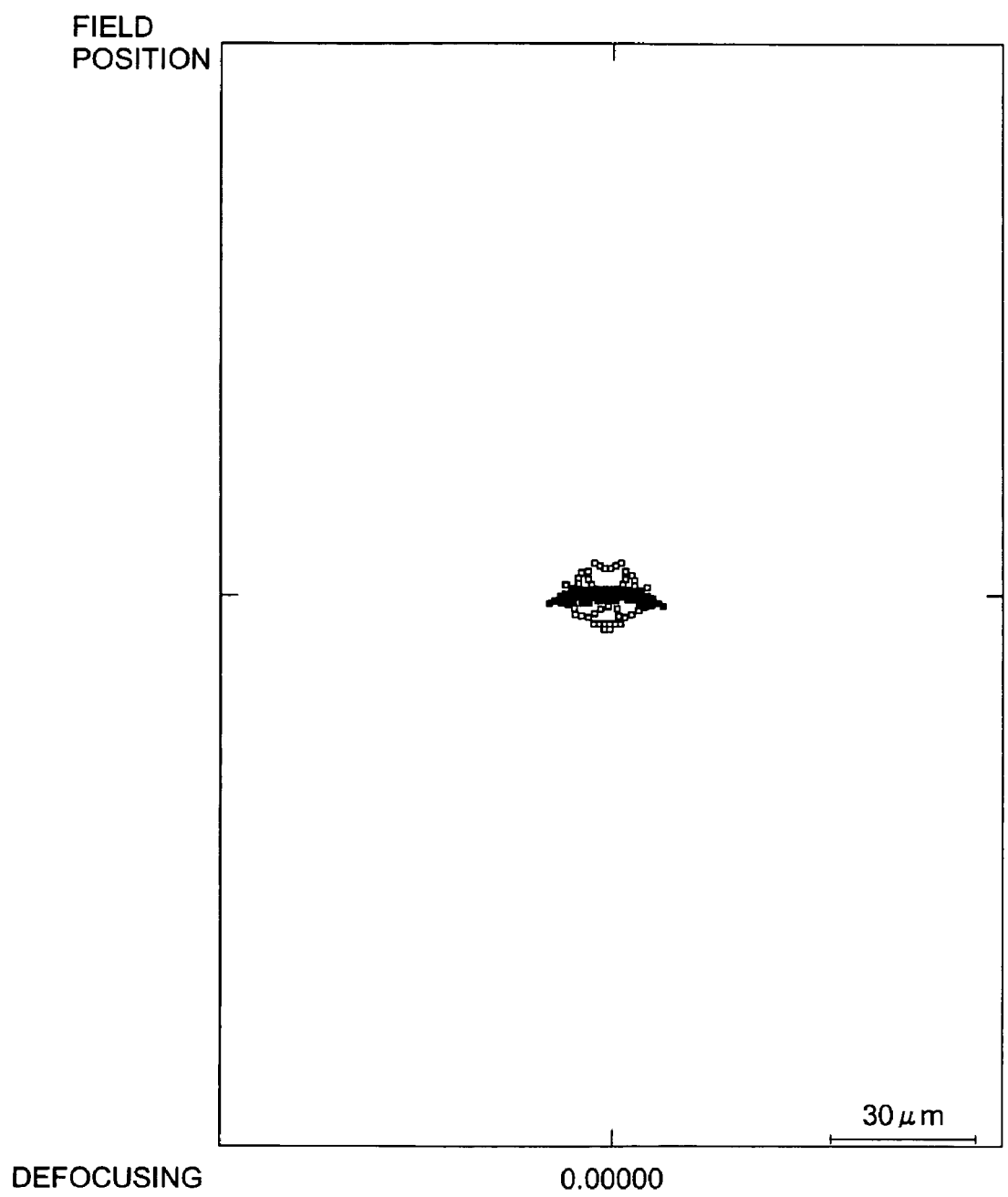
FIG. 12 is a view showing an enlarged appearance of a spot formed by focusing light on a light receiving surface of light receiving element 12 in FIG. 2 in the event of FIG. 10(b) (unevenly spaced by straight lines).
Figure 13:
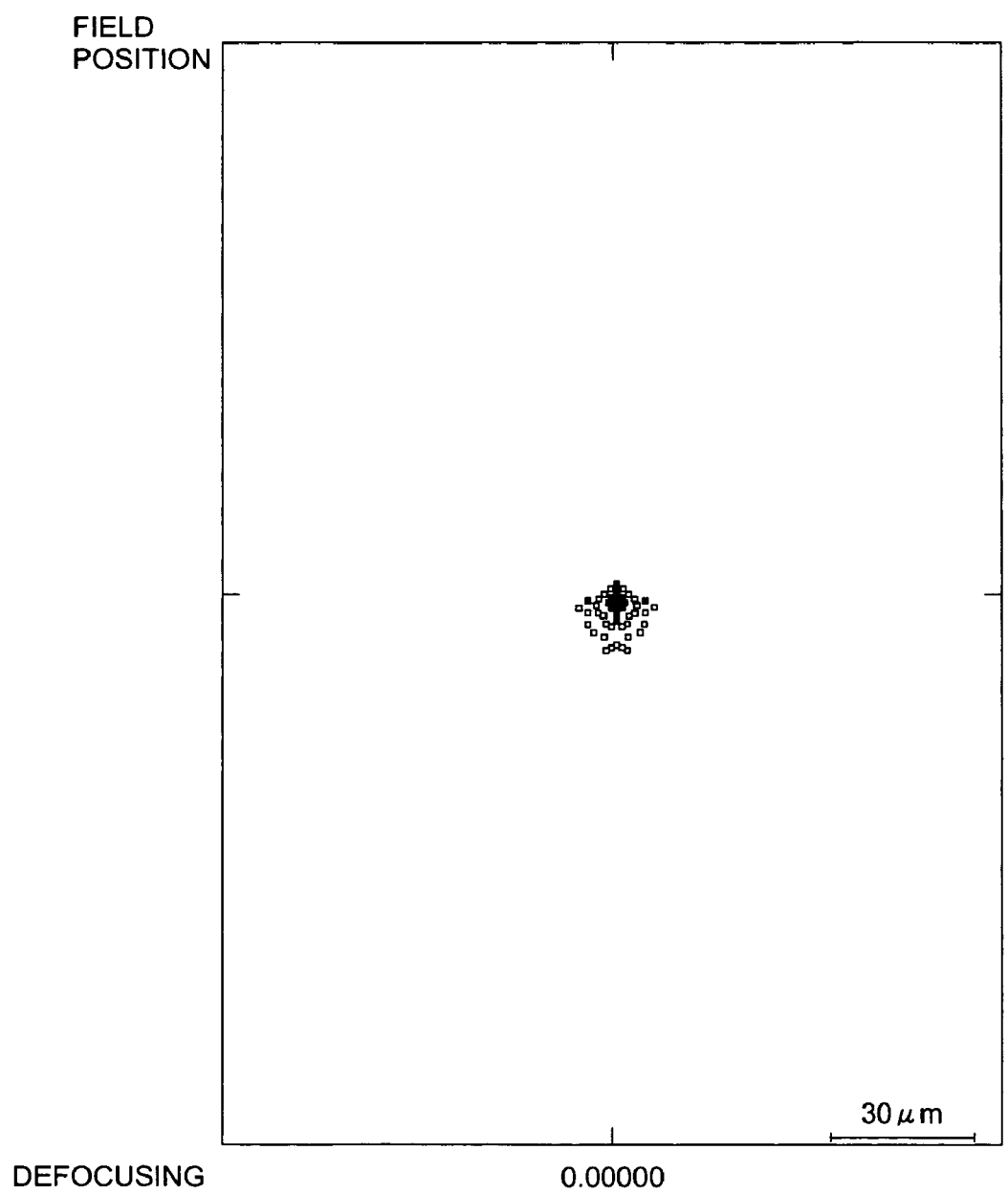
FIG. 13 is a view showing an enlarged appearance of a spot formed by focusing light on a light receiving surface of light receiving element 12 in FIG. 2 in the event of FIG. 10(c) (unevenly spaced by quadratic curved lines).
Figure 14:
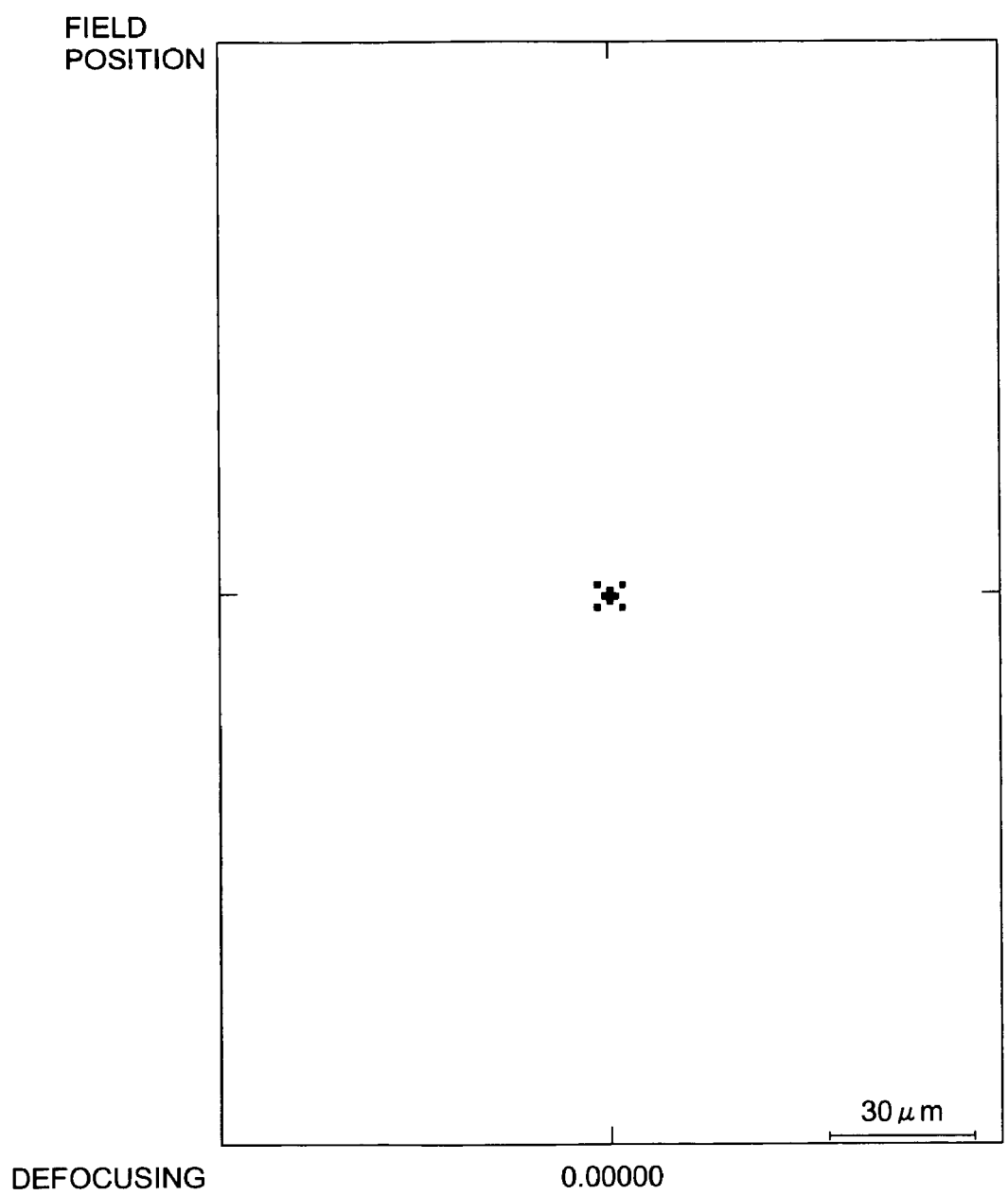
FIG. 14 is a view showing an enlarged appearance of a spot formed by focusing light on a light receiving surface of light receiving element 12 in FIG. 2 in the event of FIG. 10(d) (unevenly spaced by free-form curved lines).

FIG. 11 is an enlarged diagram showing an appearance of a spot formed by focusing light on a light receiving surface of light receiving element 12 in FIG. 2 when grating in FIG. 10(a) (evenly spaced by straight lines) is used. FIG. 12 is an enlarged diagram showing an appearance of a spot formed by focusing light on a light receiving surface of light receiving element 12 in FIG. 2 when grating in FIG. 10(b) (unevenly spaced by straight lines) is used. FIG. 13 is an enlarged diagram showing an appearance of a spot formed by focusing light on a light receiving surface of light receiving element 12 in FIG. 2 when grating in FIG. 10(c) (unevenly spaced by quadratic curved lines) is used. FIG. 14 is an enlarged diagram showing an appearance of a spot made by focusing light on a light receiving surface of light receiving element 12 in FIG. 2 when grating in FIG. 10(d) (unevenly spaced by free-form curved lines) is used.

In FIG. 1 and FIG. 2(a), a light beam coming from optical fiber 1 is diffracted by grating 15 and condensed by lens 13 to travel toward light receiving element 12, and although aberration is caused because the light beam travels out of axis of the lens, the shape of the spot on a light receiving surface of light receiving element 12 shown in FIG. 2(a) becomes like that shown in FIG. 11, when pitch d of stair-shaped multi-level grating 18 is evenly given by straight lines as shown in FIG. 10(a). Even if the direction of the lens is changed in FIG. 11, the form of the aberration remains basically unchanged.

When the pitch d of stair-shaped multi-level grating 18 is unevenly spaced by straight lines as shown in FIG. 10(b), the shape of the spot on a light receiving surface of light receiving element 12 is improved as shown in FIG. 12, and the coupling efficiency is improved to be better than that of a grating pitch of which is evenly given by straight lines as shown in FIG. 11.

When the pitch d of stair-shaped multi-level grating 18 is unevenly given by quadratic curved lines as shown in FIG. 10(c), the spot shape on a light receiving surface of light receiving element 12 is improved as shown in FIG. 13, and the coupling efficiency on the light receiving surface is improved to be better than that of the shape in FIG. 12.

When the pitch d of stair-shaped multi-level grating 18 is unevenly given by free-form curved lines (for example, polynomial shape) as shown in FIG. 10(d), the shape of the spot on a light receiving surface of light receiving element 12 is improved more as shown in FIG. 14 and the coupling efficiency on the light receiving surface is improved to be better than that of the shape in FIG. 13.

The shape of the focus spot can be improved by adjusting pitch d of stair-shaped multi-level grating 18 to be unevenly given by straight lines as shown in FIG. 10(b) according to the height of incidence of the lens as stated above, because the comatic aberration in FIG. 11 expands mainly in vertical directions, and it can be improved more by employing curved lines without inflection points (for example, quadratic curved lines as shown in FIG. 10(c)), and besides, it can be improved much more by employing free-form curved lines in a polynomial shape as shown in FIG. 10(d).

In the mold machining process, a fly cut method can be applied and the manufacturability is improved when the grating is structured with straight lines like that shown in FIGS. 10(a) and 10(b), however the turning radius of the tool is restricted because it needs a recess determined by the turning radius and the depth of the diffraction grating, in order to cut a bottom surface of the diffracting grating, and when a diameter of lens 13 is small, the recess is lost practically and therefore, manufacturability in the structure in FIG. 10(c) is lower than that in a structure with straight lines, and manufacturability in the structure in FIG. 10(d) is much lower.

As stated above, the size of the focusing light spot on a light receiving surface of light receiving element 12 can be improved and the coupling efficiency on the light receiving surface can also be improved by employing uneven pitch for a wavelength separation grating in optical bidirectional module 10.

Next, a further explanation will be given regarding the invention, referring to examples in which a planar pitch structure of a grating, projected on a plane perpendicular to the optical axis of the grating is changed as shown in FIGS. 10(a)–(d), to which, however, the invention is not limited.

Design values are determined as follows, looking only zero$^{th}$-order diffraction and first-order diffraction on a grating having M steps as shown in FIG. 9.

Pitch d: 26 µm of median

Number of steps M: The number into which each space between phase curved lines is evenly divided, and which is a natural number greater than or equal to 2 satisfying the following equation.

Width of each step W: $W = d/M$

Here, $d = \lambda / \sin \theta$ ($\theta$ is a prescribed angle of first-order diffraction)

Both the number of steps M and height of step h follow the same principle. Specifically, when it is presupposed that the wavelength of transmitted light is $\lambda 0$ and the wavelength of first-order diffracted light ray is $\lambda 1$, h and M need to exist to allow an existence of integers J and K which satisfy the following equations (3) and (4). Here, symbol n is a refractive index of the grating.

$$h = J\lambda 0 / (n-1) \quad (3)$$

$$J\lambda 0 = \lambda 1 K (M-1)/M \quad (4)$$

Symbols J, K and h are determined so that they satisfy above-stated equations (3) and (4), and so that integers J, K and natural number M may exist. For example, conditions of K=1, J=1, h=2.62 µm and M=8 satisfy the above-stated equations (3) and (4) on the supposition that $\lambda 0 = 1.31$ µm and $\lambda 1 = 1.5$ µm.

Figure 15:
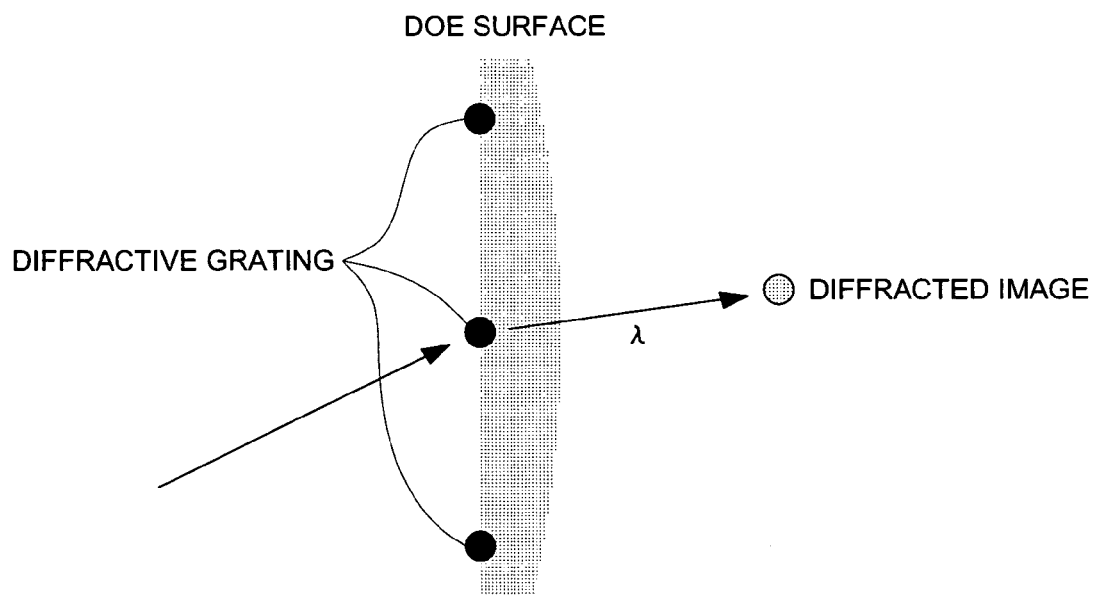
FIG. 15 is a view explaining schematically the case where a light beam with wavelength $\lambda$ forms a diffraction pattern on a diffraction grating on DOE (Diffractive Optical Element) as an example of this embodiment.
Figure 16:
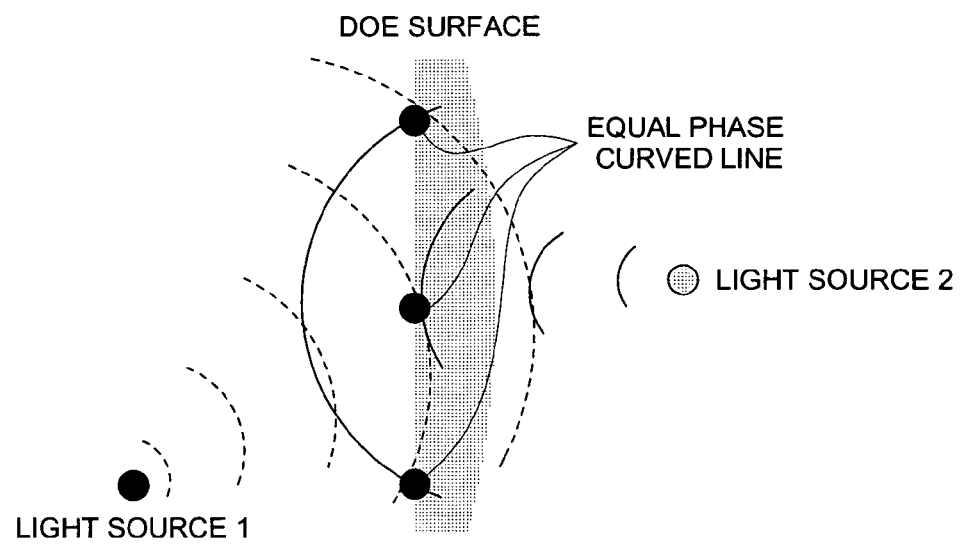
FIG. 16 is a view explaining schematically the case where a phase function is calculated on the DOE surface by making two light fluxes coming from light sources 1 and 2 interfere with each other as an example of this embodiment.

In the case where light with wavelength λ forms a diffraction pattern by diffraction grating on DOE (Diffractive Optical Element) surface as shown in FIG. 15, there is calculated a phase function given by contour lines of phase difference on DOE surface made by making two light fluxes coming from light sources 1 and 2 interfere with each other. The grating is drawn by contour curved lines so that the value of the phase function becomes a multiple of 360 degrees, and the stair-shaped multi-level grating is structured so that each contour line made by dividing the space evenly by number M between the predetermined contour lines becomes a boundary of each step.

The phase function (implicit function) is described by the following equation.

$$\theta = f(x, y)$$
$$= (C1x + C2y + C3x^2 + C4xy + C5y^2 +$$
$$C6x^3 + C7x^2y + C8xy^2 + C9y^3 +$$
$$C10x^4 + C11x^3y + C12x^2y^2 + C13xy^3 + C14y^4 +$$
$$C15x^5 + \ldots + \ldots +$$
$$C55x^{10} + \ldots + C65y^{10}) / \lambda (\times 360) = 360n$$

Here, symbol n: Integer, Unit of x and y: mm

By using the above-stated phase function, calculation has been done for the examples (1) to (4) described below.

(1) In the case where a grating is structured by free-form curved lines as shown in FIG. 10 (d), calculation of coefficients is carried out on the condition that $\lambda=1.56\times10^{-3}$ mm including every term of phase function according to the above-stated phase function.

An example for each coefficient is shown below.
C1:C2: 0.0399573996016
C3: −0.0000249469148046
C5: −0.0000249468855604
C10: −0.000351010616246
C12: −0.000702115022462
C14: −0.000351011962062

(2) In the case where a grating is structured by quadratic curved lines as shown in FIG. 10(c), C2 and only coefficients of quadratic terms of x and y are calculated according to the aforementioned phase function. An example for each coefficient is described below.
C2: −5.9155E-02
C3: 1.2534E-03
C5: 1.6547E-03
C12: −1.9093E-03

(3) In the case where a grating is structured by straight lines unevenly spaced as shown in FIG. 10(b), calculation is carried out according to the above-stated phase function excluding terms of x. An example of each coefficient is described below.
C2: −5.9155E-02
C5: 1.6121E-03
C9: 6.8986E-04

(4) In the case where a grating is structured by straight lines evenly spaced (a constant distance) as shown in FIG. 10(a), for example, calculation is carried out on the condition that C2: −5.8247E-02.

Equiphase line for each value n is described as $$y_n = y0_n + y1_n x^2 + y2_n x^4 + y3_n x^6 + y4_n x^8 \ldots$$

and can be an explicit function.

Figure 17:
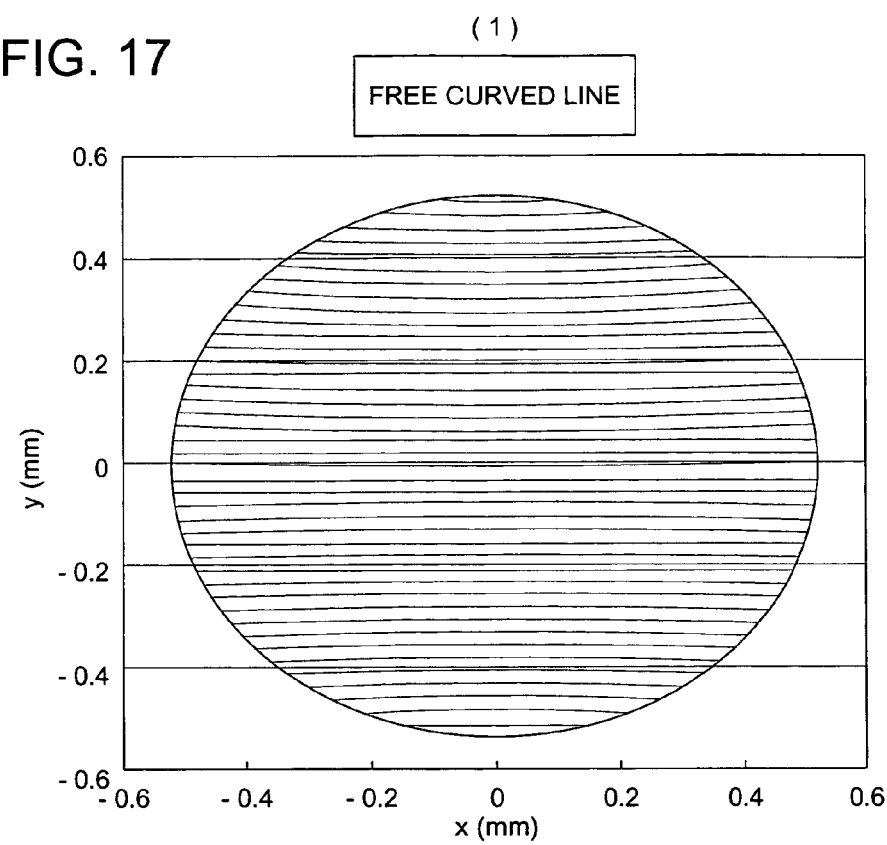
FIG. 17 is a plan view of a grating in the example (1) (unevenly spaced by free-form curved lines)
Figure 18:
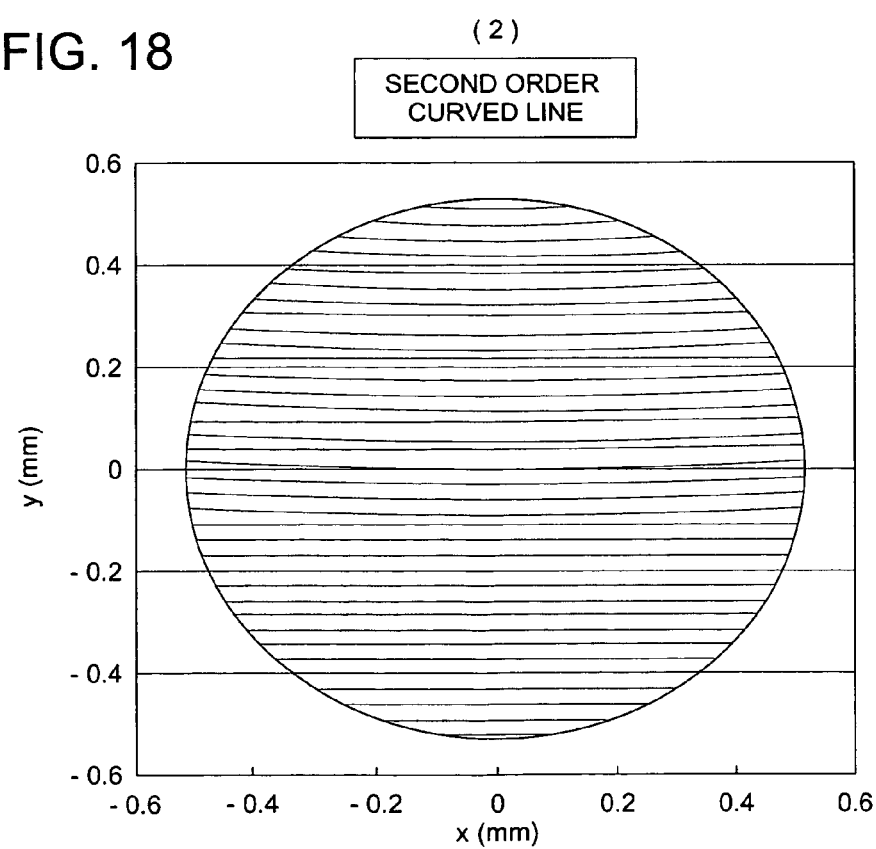
FIG. 18 is a plan view of a grating in the example (2) (unevenly spaced by quadratic curved lines)
Figure 19:
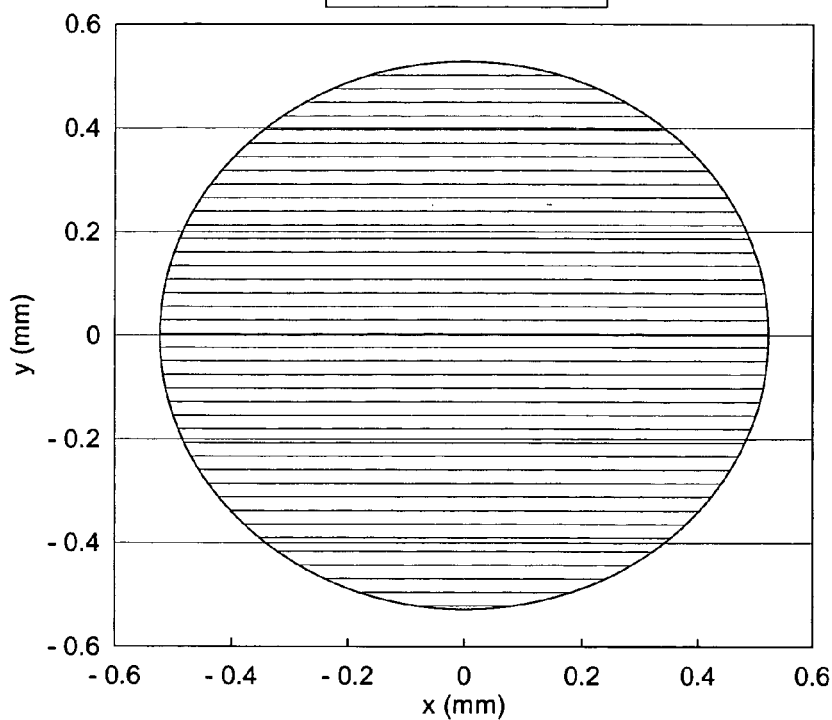
FIG. 19 is a plan view of a grating in the example (3) (unevenly spaced by straight lines)
Figure 20:
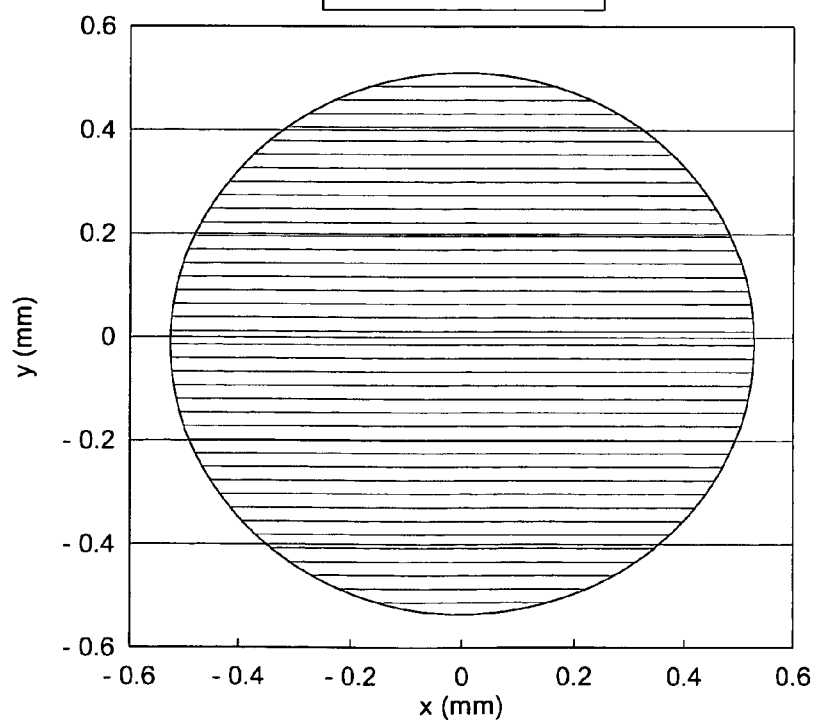
FIG. 20 is a plan view of a grating in the example (4) (evenly spaced by straight lines)

Drawings on which planar forms of grating are illustrated are shown in the FIG. 17 (unevenly spaced by free-form curved lines), FIG. 18 (unevenly spaced by quadratic curved lines), FIG. 19 (unevenly spaced by straight lines) and FIG. 20 (evenly spaced by straight lines) regarding the above-stated cases (1)–(4).

The preferred embodiment of the invention has been explained above, however, this invention is not limited to the foregoing and it is possible to apply various modifications within the range of technical spirit of the invention. For example, the optical bidirectional module can be composed so that mirrors may be placed between the grating and the light emitting element as well as the light receiving element.

Figure 8C:
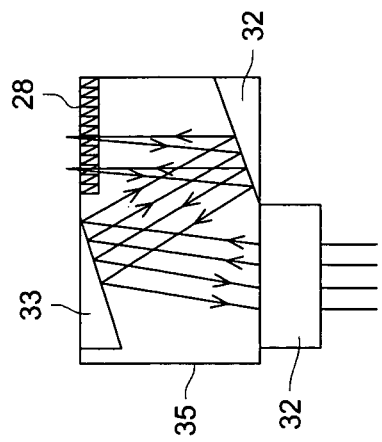
FIG. 8 is a view showing modified examples (a), (b) and (c) of optical bidirectional module of this embodiment in which mirrors are installed.
Figure 8B:
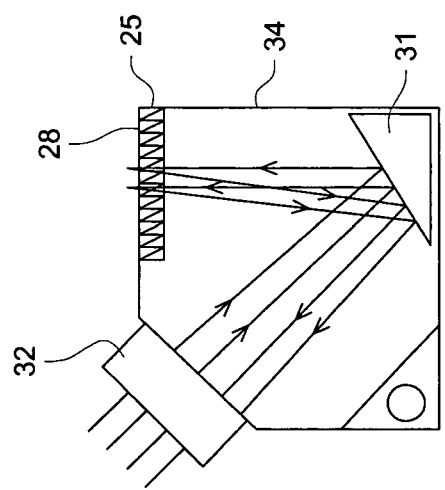
Figure 8A:
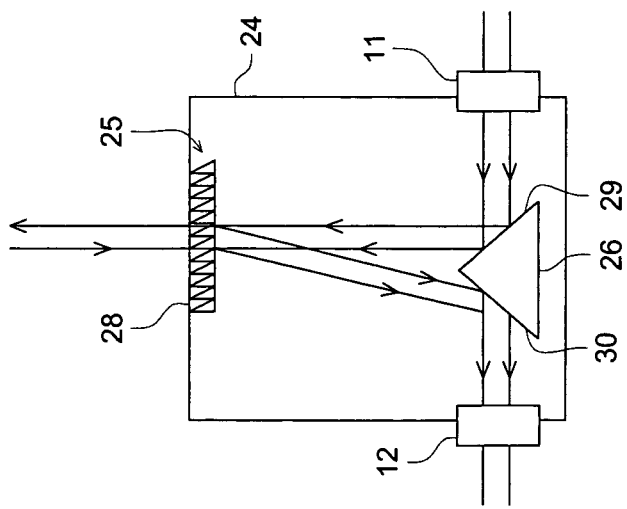

For example, grating element 25 on which stair-shaped multi-level gratings 28 similar to those in FIGS. 2(b) and 2(c) are formed and prism type mirror 26 are located to face each other in casing 24 as shown in FIG. 8(a) and light emitting element 11 and light receiving element 12 are located to face each other with the prism type mirror 26 between them. A light beam from light emitting element 11 is reflected substantially at right angles on mirror surface 29 of prism type mirror 26 to enter and is transmitted through grating element 25 and enters the end facet of optical fiber to be outputted to the outside as zero$^{th}$-order diffracted light ray. On the other hand, diffracted light ray produced by grating element 25 from a light beam coming from the end facet of optical fiber, the order of which is higher than zero$^{th}$, is reflected on the other mirror surface 30 of the prism type mirror 26 and enters light receiving element 12. In this way, it is possible to shorten the total length of optical bidirectional module by deflecting once the first light path located between the end facet of optical fiber and light emitting element 11 and also by deflecting the second light path located between the end facet of optical fiber and light receiving element 12 toward substantially the direction opposite to the first light path, with prism type mirror 26 as shown in FIG. 8(a).

Grating element 25 on which plural stair-shaped multi-level gratings 28 are formed and mirror 32 are located substantially to face each other and optical element 31 which contains a light emitting element as well as a light receiving element and mirror 32 are located substantially to face each other in casing 34 as shown in FIG. 8(b). A light beam from the light emitting element in optical element 31 is reflected on mirror 32 and enters and is transmitted through grating element 25 to enter the end facet of optical fiber and is outputted to the outside as zero$^{th}$-order diffracted light ray. On the other hand, diffracted light ray produced by grating element 25 from a light beam coming from the end facet of optical fiber, the order of which is higher than zero$^{th}$, is reflected on mirror 32 and enters the light receiving element in optical element 31. In this way, it is possible to shorten the total length of the optical bidirectional module by deflecting once the first light path between the end facet of optical fiber and the light emitting element as well as the second light path between the end facet of optical fiber and the light receiving element, with the common mirror 32, in FIG. 8(b).

A mirror is added in FIG. 8(b) like shown in FIG. 8 (c) so that mirrors 33 and 34 are located between grating element 25 and optical element 31 which contains a light emitting element and a light receiving element in casing 35. As shown in FIG. 8(c), the total length of the optical bidirectional module can be shorter than that in FIG. 8(b) by deflecting twice at two places each the first light path between the end facet of optical fiber and the light emitting element as well as the second light path between the end facet of optical fiber and the light receiving element, with the common mirrors 33, 34.

What is claimed is:

1. An optical bidirectional module to mix and separate optical signals with different wavelengths used for bidirectional optical fiber communication by a wavelength multiplex system, comprising,
    a light emitting element which transmits an optical signal to an end facet of an optical fiber;
    a light receiving element which receives an optical signal from the end facet of the optical fiber; and
    a stair-shaped multi-level grating,
    wherein the stair-shaped multi-level grating separates a first light path between the end facet of the optical fiber and the light emitting element and a second light path between the end facet of the optical fiber and the light receiving element in accordance with a respective different wavelength of each optical signal.

2. The optical bidirectional module described in claim 1, wherein the wavelength of the optical signal from the light emitting element is preferably allocated to a zero$^{th}$-order diffracted light ray, and the other wavelength of the optical signal corresponding to the second light path to the light receiving element is allocated to a diffracted light ray whose diffraction order is the first order or higher.

3. The optical bidirectional module described in claim 1, wherein the height h of each step of the stair-shaped multi-level grating satisfies the following equation.

$$h = K \cdot \{(M-1)/M\} \cdot \{\lambda 1/(n-1)\}$$

where M is the number of steps of stair-shaped multi-level grating, $\lambda 1$ is the wavelength of a high-order diffracted light ray of the fist order or higher, n is the refractive index of a constructing medium of the grating, and K is an arbitrary positive integer.

4. The optical bidirectional module described in claim 3, wherein an optical path length difference h(n−1) between two adjacent steps constructing the stair-shaped multi-level grating is an integer multiple of the wavelength $\lambda 0$ of a zero$^{th}$-order diffracted light ray.

5. The optical bidirectional module described in claim 1, wherein planar pitches of the stair-shaped multi-level grating projected on a plane perpendicular to the optical axis of the grating are set at unequal intervals for aberration correction.

6. The optical bidirectional module described in claim 1, wherein the stair-shaped multi-level grating has a straight line uneven interval structure projected on a plane perpendicular to the optical axis of the grating.

7. The optical bidirectional module described in claim 1, wherein the stair-shaped multi-level grating has a curved-line uneven interval structure projected on a plane perpendicular to the optical axis of the grating.

8. The optical bidirectional module described in claim 1, wherein a coupling lens is placed between the end facet of optical fiber and both of the light emitting element and the light receiving element and the grating is structured on the surface of the coupling lens surface facing the end facet of the optical fiber.

9. The optical bidirectional module described in claim 1, wherein a mirror is placed between the grating and both of the light emitting element and the light receiving element such that the first light path and the second light path are bent at least once between the fiber facet and both of the light emitting element and the light receiving element.

* * * * *